(12) United States Patent
Sloan et al.

(10) Patent No.: US 6,230,908 B1
(45) Date of Patent: May 15, 2001

(54) FLOW RACK WITH REVERSE FLOW LIMITING DEVICE

(75) Inventors: Robert C. Sloan, Round Rock; Mark Manley, Leander; Stephen Gill, Round Rock; Roy Rachui, Georgetown, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/388,130

(22) Filed: Sep. 1, 1999

(51) Int. Cl.[7] ........................................................ A47F 5/08
(52) U.S. Cl. ............................................ 211/151; 193/35 A
(58) Field of Search .................................. 211/151, 59.2, 211/183, 186, 153, 175; 414/267, 273, 276, 286; 198/781.01, 739, 744, 746, 783; 193/35 A, 35 R

(56) References Cited

U.S. PATENT DOCUMENTS

| | | | |
|---|---|---|---|
| 3,420,348 | * | 1/1969 | Caudell et al. ....................... 211/151 |
| 3,586,142 | * | 6/1971 | Inwood ................................ 193/35 A |
| 3,881,585 | * | 5/1975 | Coleman ............................. 193/35 A |
| 3,900,112 | * | 8/1975 | Azzi et al. .......................... 193/35 R |
| 3,915,275 | | 10/1975 | Specht . |
| 3,990,557 | * | 11/1976 | Carder ................................ 193/35 A |
| 4,030,423 | | 6/1977 | Krammer . |
| 4,054,195 | * | 10/1977 | Wahl .................................. 193/35 R |
| 4,168,780 | | 9/1979 | Parrott . |
| 4,185,729 | * | 1/1980 | Obermeyer .......................... 193/35 A |
| 4,219,114 | * | 8/1980 | Kovacs ................................ 193/35 A |
| 4,253,558 | * | 3/1981 | Roeing et al. ....................... 193/35 A |
| 4,383,598 | | 5/1983 | Newman . |
| 4,410,072 | | 10/1983 | Dickinson et al. . |
| 4,541,518 | | 9/1985 | Palazzolo et al. . |
| 4,646,909 | * | 3/1987 | Vom Stein ............................ 198/460 |
| 4,681,203 | | 7/1987 | Kornylak . |
| 4,715,765 | * | 12/1987 | Agnoff ................................ 414/276 |
| 4,765,493 | * | 8/1988 | Kinney ................................ 211/59.2 |
| 4,815,914 | | 3/1989 | O'Brien et al. . |
| 5,033,600 | * | 7/1991 | Klein .................................. 193/35 A |
| 5,048,661 | * | 9/1991 | Toye .................................. 193/35 R |
| 5,213,189 | * | 5/1993 | Agnoff ................................ 193/35 A |
| 5,295,591 | * | 3/1994 | Slater ................................ 211/59.2 |
| 5,320,212 | | 6/1994 | McIntosh et al. . |
| 5,873,473 | * | 2/1999 | Pater .................................. 211/183 |
| 5,894,942 | | 4/1999 | Miyashita et al. . |

\* cited by examiner

*Primary Examiner*—Daniel P. Stodola
*Assistant Examiner*—Jennifer E. Novosad
(74) *Attorney, Agent, or Firm*—Haynes and Boone, LLP

(57) ABSTRACT

A flow rack including a frame with a plurality of elongated channels attached to the frame. Each channel includes two spaced apart sides and a base wall extending between the sides. A plurality of rollers is movably mounted in each one of the channels. A portion of each roller extends above the respective channel at a first height. A reverse flow stop is pivotally mounted within each channel for movement between a stop position and a flow position. Each stop includes a stop arm. A weighted portion is attached to each stop for automatically biasing each stop to the stop position whereby the respective stop arm extends above the respective channel at a second height, greater than the first height. When the stop is in the flow position, the stop arm extends above the channel at a height equal to or less than the first height.

22 Claims, 4 Drawing Sheets

FLOW RACK WITH REVERSE FLOW LIMITING DEVICE

BACKGROUND

The disclosure herein relates generally to flow rack systems and more particularly to a gravity flow rack with a reverse flow limiting device.

Gravity flow racks are often used in warehouse and manufacturing environments. They provide an effective solution for transporting, storing and dispensing packaged and containerized goods. They are preferred in many applications because they reduce floor space, decrease restocking time and provide for a more efficient flow of goods through a work stream.

A typical gravity flow rack includes a frame with a plurality of flow rails mounted to the frame. The flow rack has a front end where items are removed from the flow rack and a back end where items are placed onto the flow rails. The flow rails are spaced apart and mounted at a downward angle such that the ends of the flow rails adjacent to the front end of the flow rack are at a lower elevation than the end of the flow rails adjacent to the back end of the flow rack. The items that are closest to the front of the flow rack rest under the force of gravity against a retention member that is attached to the flow rack adjacent to the front end.

U.S. Pat. No. 4,681,203 discloses an un-driven gravity roller conveyor in which a plurality of discrete, elongate channel members are attached in a spaced-apart, parallel relationship to a base structure. The separation between neighboring channel members is made equal to the separation between the opposite side walls of each channel member, thereby providing a plurality of rows extending between the side walls of the channel members. Open slots equidistantly spaced apart are formed along the upper edges of each side wall. The slots are aligned in parallel columns substantially perpendicular to the length of the rows. Load-bearing rollers mounted upon axles are arranged in rows both between the opposite side walls in each channel member and between adjacent side walls of neighboring pairs of channel members, with the axles of the rollers held within the slots. The spacing between slots is substantially less than one-half of the exterior diameter of the rollers.

U.S. Pat. No. 4,541,518 discloses a material flow rail construction of the type employed to transport containers or articles from one location to another using the force of gravity. The improved material flow rail comprises a substantially U-shaped channel within which a multiplicity of mounting bolts is attached. Individual bearing assemblies are placed on the mounting bolts. By placing the individual bearing assemblies closely adjacent one another in a longitudinal direction with respect to the support channel, the flow rail has the ability to transport parts having very small "footprint" areas because a large space between rollers is not presented for parts or components thereof to become caught. By providing a loose fit between the bearing inner races and the supporting mounting bolts, the inner race is permitted to rotate slightly with respect to the mounting bolts thereby presenting new wear surfaces as the flow rail is put into use. Additionally, a loose fit may be provided between the mounting bolts and the support channel to permit the latter to rotate with respect to the former, also presenting new wear surfaces.

U.S. Pat. No. 4,168,780 discloses a storage rack structure of the gravity feed type having inclined storage racks carried between front and rear vertical standards. Items such as pallets, carrying cases and the like are loaded from the rear for gravity feed to the front. The flow rails are hung within a channel of a front facing rail having a back web providing an abutment for stopping the pallets, and include a raised abutment at the rear end thereof providing a fulcrum about which each pallet initially impacts and pivots for loading onto the flow rail.

U.S. Pat. No. 3,915,275 discloses a set of constructional elements which may be combined to define conveyor devices, such as roller trains, continuously running shelves, and band conveyors, etc. The set of constructional elements includes elongated, generally U-shaped support frames having slit and T-shaped recesses therein, and cooperating fittings adapted to be inserted into the slits and capable of supporting the roller elements. The constructional elements may be assembled in varied configurations to define the desired conveyor device.

A common problem with flow racks is that a container full of items, some of them fragile and expensive, may be pushed off the back end of the flow rack when containers are stacked along the entire length of the flow rails. This typically occurs when the frontmost container is being removed. To remove the front container, the front container and any containers stacked behind the front container must be pushed in a reverse direction to release the frontmost container from against the retention member. If a container is too close to the back end of the rack and it is pushed back far enough, it will fall off of the flow rack. This can result in damage to the items in the fallen container.

Accordingly, a need has arisen for a flow rack including a reverse flow limiting device that overcomes the shortcomings of previous flow rack constructions and techniques.

SUMMARY

One embodiment, accordingly, provides a reverse flow limiting device that may be attached to a flow rail. To this end, one embodiment provides a flow rail assembly including an elongated channel with a plurality of rollers movably mounted in the channel. A portion of each roller extends above the channel at a first height. A reverse flow stop including a stop arm is pivotally mounted in the channel for movement between a stop position and a flow position. A weighted portion is attached to the stop for automatically biasing the stop to the stop position whereby the stop arm extends above the channel at a second height. The second height is greater than the first height.

A principal advantage is that the reverse flow stop may be retrofitted to existing flow rails.

BRIEF DESCRIPTION OF THE DRAWING FIGURES

DETAILED DESCRIPTION

Figure 1:
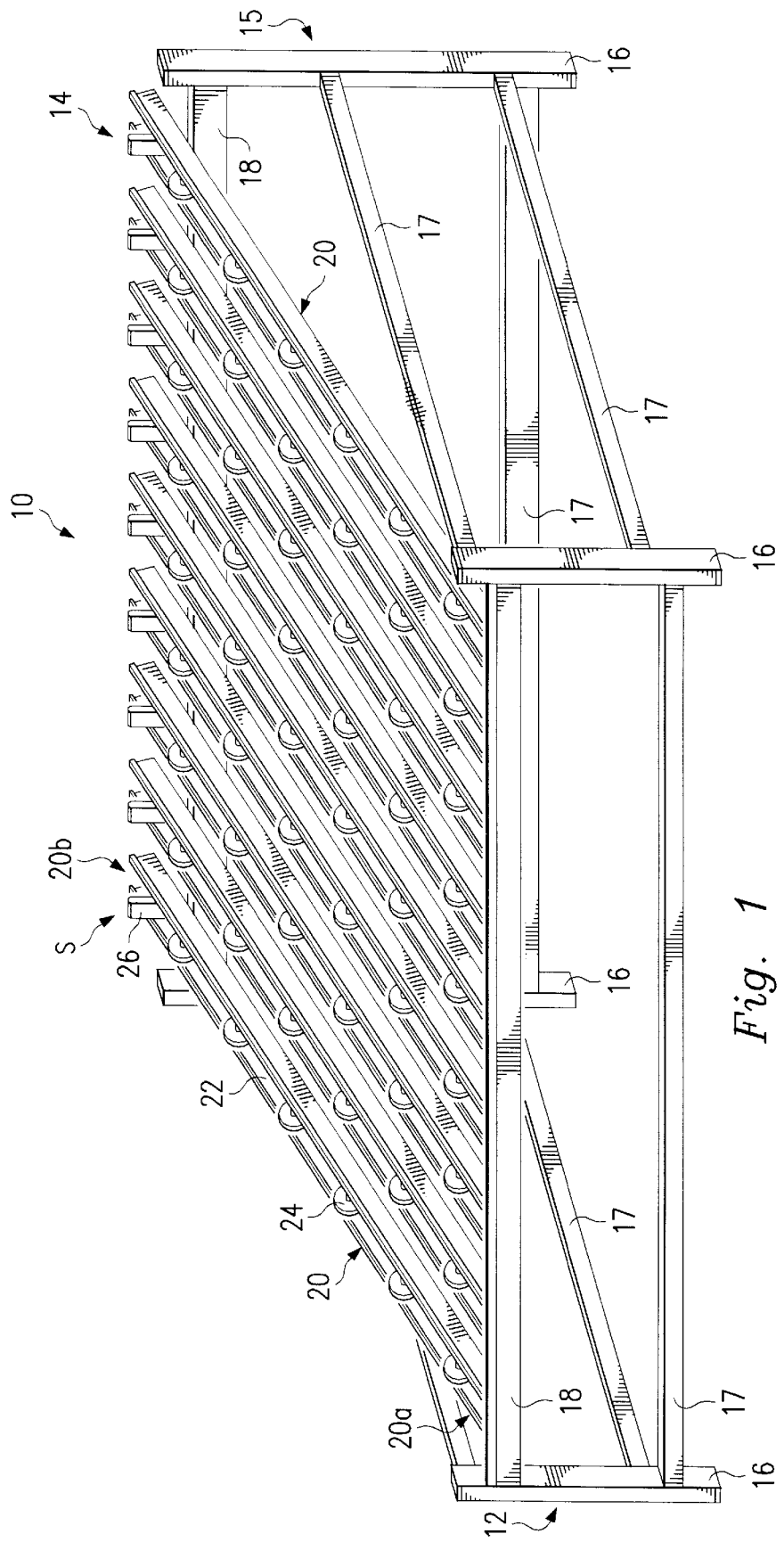
FIG. 1 is a perspective view illustrating an embodiment of a flow rack.

An embodiment of a flow rack 10 is illustrated in FIG. 1. The flow rack 10 has a front end 12 and a back end 14. The flow rack 10 includes a frame 15 having a plurality of legs 16, a plurality of reinforcing members 17 and a plurality of support members 18. The reinforcing members 17 and the support members 18 are attached to the legs 16.

A plurality of spaced apart flow rails 20, FIG. 1, are attached to the support members 18. Each flow rail 20 has a first end 20a attached adjacent to the front end 12 of the flow rack 10. A second end 20b of each flow rail 20 is attached adjacent to the back end 14 of the flow rack 10. The second end 20b is elevated with respect to the first end 20a.

Still referring to FIG. 1, each flow rail 20 includes a channel 22. A plurality of rollers 24 are movably mounted in each channel 22 and a flow stop 26 is pivotally mounted in each channel 22. The flow stop 26 is positioned adjacent to the back end 14 of the flow rack 10. The flow stop 26 is biased to a stop position S.

Figure 2:
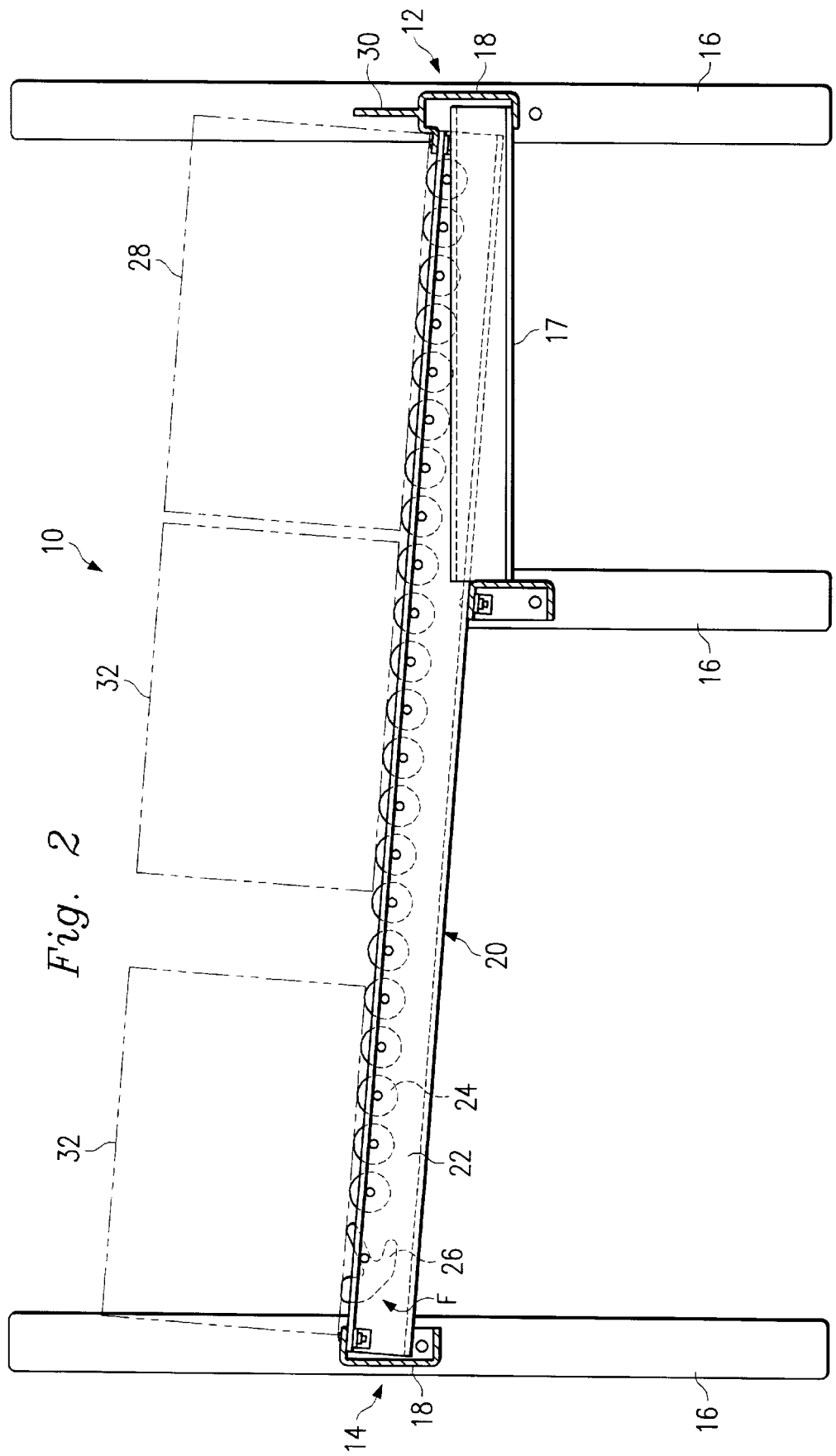
FIG. 2 is a side view illustrating an embodiment of a flow rack with a stop in a flow position.

A plurality of containers, FIG. 2, are carried by at least two adjacent flow rails 20. A lead container 28 is positioned at the front end 12 of the flow rack 10. The lead container 28 is engaged under the force of gravity against a retention member 30 that is attached to the support member 18 adjacent to the first end 20a of each flow rail 20. One or more reserve containers 32 may be positioned between the lead container 28 and the back end 14 of the flow rack 10.

When loading a container onto the flow rails 20 from the back end 14 of the flow rack 10, the stop 26 pivots from the stop position S, FIG. 1, to a flow position F, FIG. 2. The stop 26 is maintained in the flow position F by the container as the container travels toward the front end 12. Once the container passes beyond the stop 26, the flow stop 26 returns to the stop position S.

Figure 3:
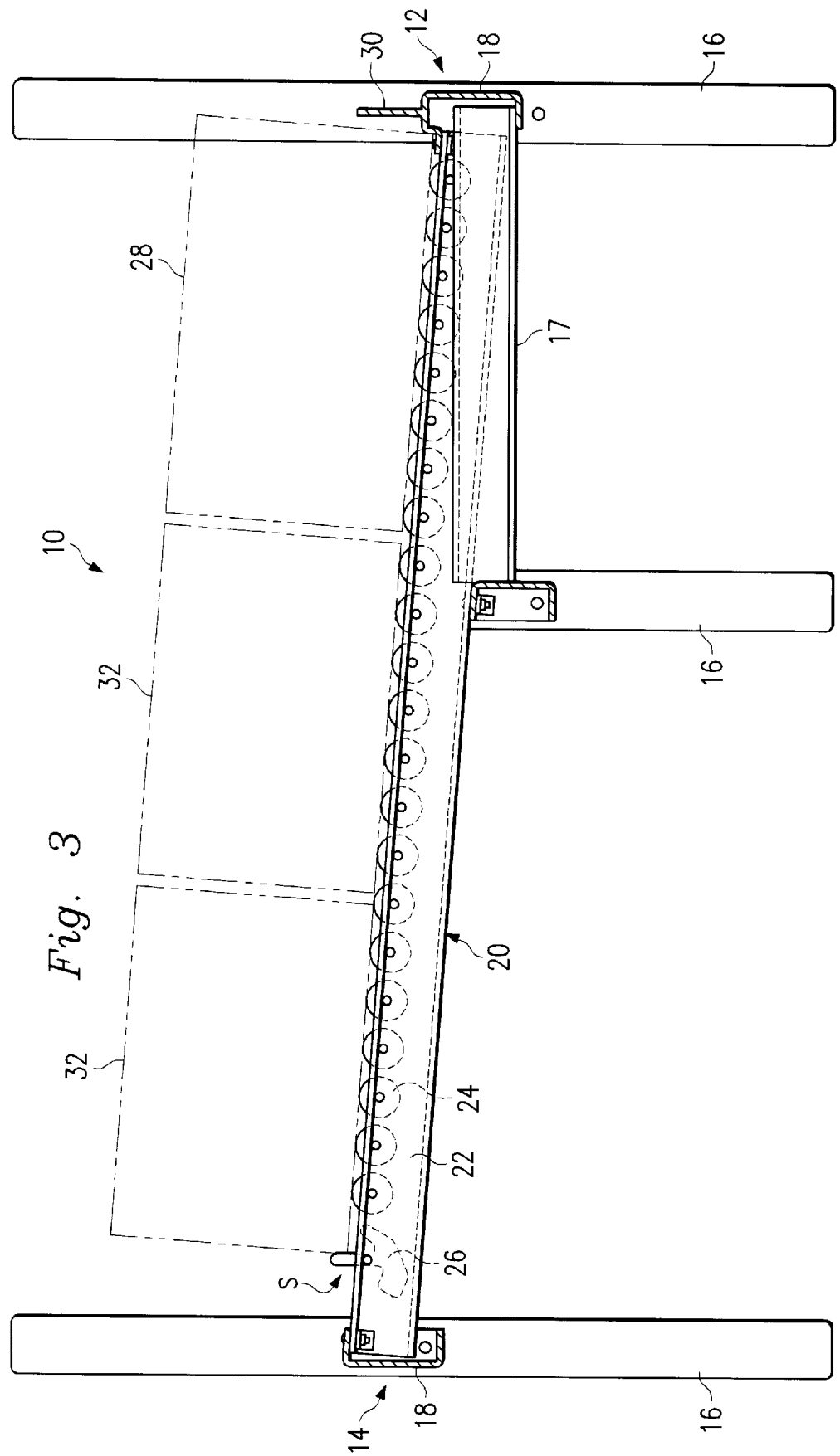
FIG. 3 is a side view illustrating an embodiment of a flow rack with the stop in a stop position.

When the lead container 28 needs to be removed from the flow rack 10, it must be moved toward the back end 14 of the flow rack 10 to release it from its engagement with the retention member 30, FIG. 3. To this end, any reserve containers 32 must also be moved toward the back end 14. The stop 26 is biased to the stop position S, FIG. 3, such that it engages the adjacent reserve container 32 to limit the distance that it can travel toward the back end 14. By limiting the distance that the containers can be moved toward the back end 14, the potential for one or more reserve of the containers 32 to fall from the back end 14 while releasing the lead container 28 is greatly reduced.

Figure 4:
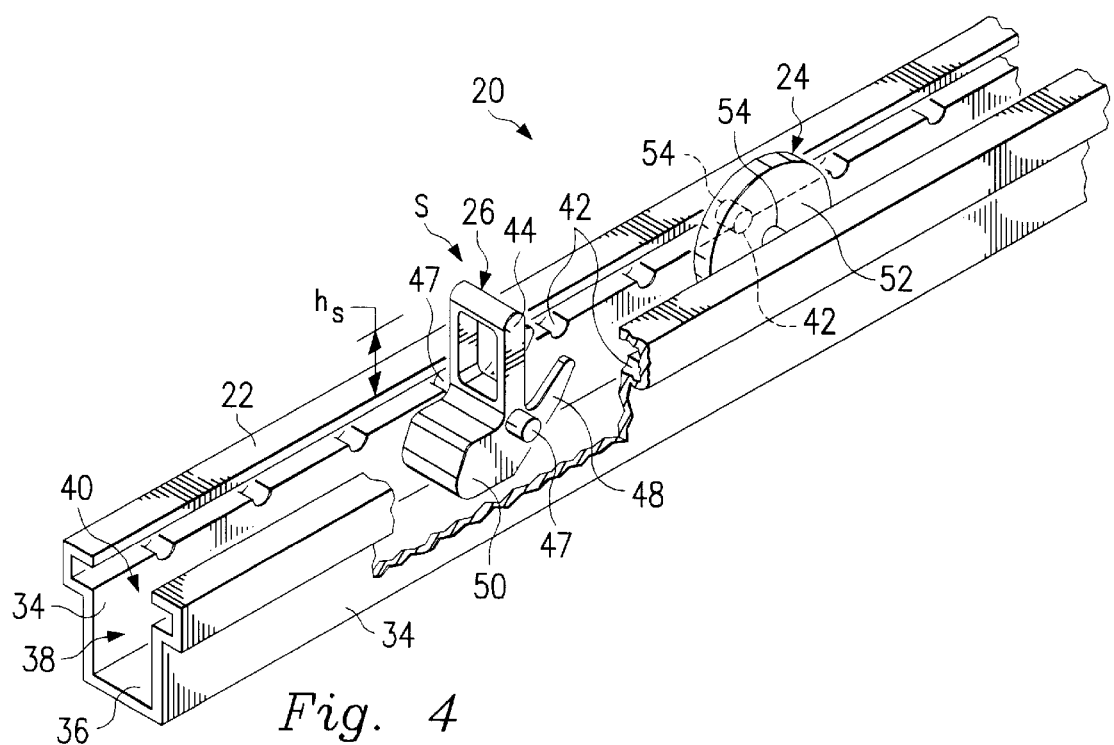
FIG. 4 is a perspective view illustrating an embodiment of a stop arm and roller mounted in a flow rail.

An embodiment of a flow rail is illustrated in FIG. 4. The channel 22 includes two opposing walls 34 and a base wall 36 attached between the opposing walls 34. The base wall 36 defines a closed end 38 of the channel 22 opposite an open end 40. A plurality of opposed saddles 42 are formed adjacent to the open end 40 in each one of the opposing walls 34 along the length of the channel 22.

The stop 26 is pivotally mounted within the channel 22. The stop 26 includes a stop arm 44, FIG. 4, that extends above the channel 22 at a height hs when arm 44 is in the stop position S. In one embodiment, the height hs may be approximately 1.0 inch. In other embodiments, the height hs may be more or less than 1.0 inch depending on the specific needs of the application.

A pair of opposed pins 47 are attached to the stop 26. The opposed pins 47 are received in respective opposed saddles 42. A rotation limiter 48 is attached adjacent to a first side of the stop arm 44 and a weighted portion 50 is attached adjacent to a second side of the stop arm 44. The stop 26 may be formed using manufacturing methods such as machining, investment casting, forging, extrusion, injection molding, and other suitable methods of manufacture. The stop arm 44, weighted portion 50, pins 47 and the rotation limiter 48 may be integrally or separately formed.

Figure 5:
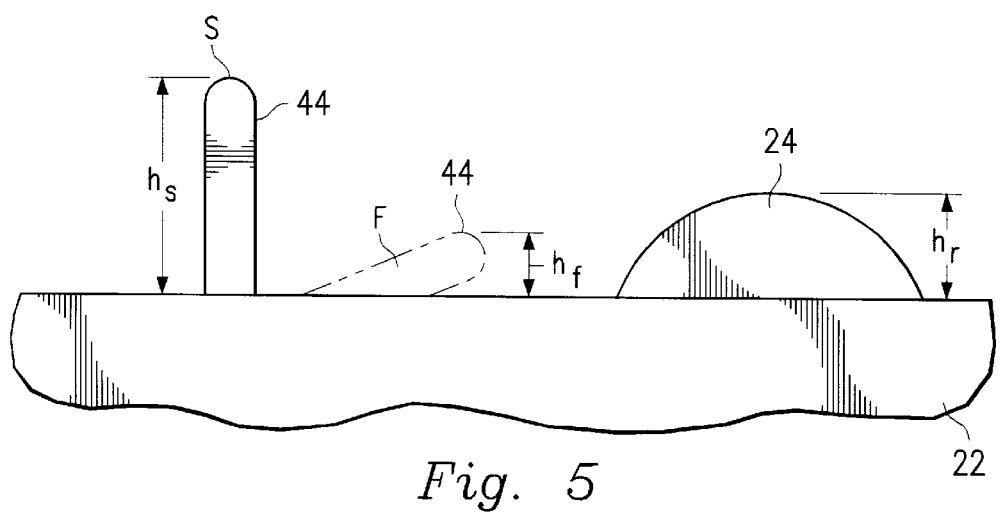
FIG. 5 is a partial side view illustrating an embodiment of relative stop arm heights and roller height extending above the flow rail.

The weighted portion 50 is positioned with respect to the pins 47 to bias the stop 26 to the stop position S. Upon sufficient rotation of the stop 26 toward the flow position F, FIG. 2, the rotation limiter 48 engages base wall 36 to limit the rotation of the stop 26. The stop 26 is positioned with the weighted portion 50 facing toward the back end 14 of the flow rack 10. The weight of the weighted portion 50 must be sufficient to bias the stop 26 to the stop position S, FIG. 4, yet allow the stop 26 to pivot freely to the flow position F, Each roller 24 includes a wheel portion 52, FIG. 4, and a pair of opposed pins 54 attached to each wheel portion 52. The opposed pins 54 of each roller 24 are received in respective opposed saddles 42. Each roller 24 extends above the channel 22 at a height hr, FIG. 5. The height hr of the roller 24 is less than the height hs of the stop arm 44. However, when the stop arm 44 is in the flow position F, FIG. 5, arm 44 extends above the channel 22 at a height hf, which is the same or less than the height hr which each roller 24 extends above the channel 22. In this manner, when arm 44 is in the flow position F, there is no interference with a container remaining engaged with the rollers 24.

One embodiment provides a flow rail including an elongated channel with a plurality of rollers movably mounted in the channel. A portion of each roller extends above the channel at a first height. A reverse flow stop including a stop arm is pivotally mounted in the channel for movement between a stop position and a flow position. A weighted portion is attached to the stop for automatically biasing the stop to the stop position whereby the stop arm extends above the channel at a second height. The second height is greater than the first height.

Another embodiment provides a flow rack including a frame with a plurality of elongated channels attached to the frame. Each one of the channels includes two spaced apart sides and a base wall extending between the sides. A plurality of rollers is movably mounted in each one of the channels. A portion of each roller extends above the respective channel at a first height. A reverse flow stop including a stop arm is pivotally mounted within each channel for movement between a stop position and a flow position. A weighted portion is attached to each stop for automatically biasing the respective stop to the stop position whereby the stop arm extends above the respective channel at a second height. The second height is greater than the first height.

A further embodiment provides a method of limiting flow on a flow rail in a reverse direction. The method includes movably mounting a plurality of rollers in an elongated channel with a portion of each roller extending above the channel at a first height. A reverse flow stop having a stop arm is pivotally mounted in the channel such that the stop is movable between a stop position and a flow position. A weighted portion is attached to the stop for automatically biasing the stop to the stop position whereby the stop arm extends above the channel at a second height, greater than the first height.

As it can be seen, the embodiments presented herein provide several advantages. One advantage is that the existing flow rails may be retrofitted with the reverse flow stops. Another advantage is that no modification is required to existing flow rails for installation and operation of the reverse flow stops. Yet another advantage is that the reverse flow stops are operable using the force of gravity. A further advantage is that the cost of the reverse flow stops is nominal with respect to the overall cost of the flow rack and with respect to the cost of many of the items carried on flow rails.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A flow rail assembly comprising:

an elongated channel;

a plurality of rollers movably mounted in the channel, a portion of each roller extending above the channel at a first height; and a reverse flow stop having a first end including a stop arm, the stop being pivotally mounted in the channel for movement between a stop position and a flow position, the stop having a second end including a weighted portion responsive to gravitational force urging the stop towards the stop position whereby the stop arm extends above the channel at a second height, which is greater than the first height.

2. The flow rail assembly of claim 1 wherein the stop arm and the weighted portion are integrally formed.

3. The flow rail assembly of claim 1 wherein the stop includes two opposing pins pivotally attached to the channel.

4. The flow rail assembly of claim 3 wherein the channel includes a plurality of opposed saddles, each pin being mounted in a respective one of the opposed saddles.

5. The flow rail assembly of claim 3 wherein the weighted portion is positioned within the channel when the stop is in the stop position.

6. The flow rail assembly of claim 1 further comprising a rotation limiter attached to the stop.

7. The flow rail assembly of claim 6 wherein the rotation limiter, the stop arm and the weighted position are integrally formed.

8. The flow rail assembly of claim 1 wherein the stop is mounted adjacent to an end of the channel.

9. The flow rail assembly of claim 1 wherein the stop arm extends above the channel at a third height which is less than the first height when the stop is in the flow position.

10. A flow rack assembly, comprising:

a frame;

a plurality of elongated channels attached to the frame, each channel including two spaced apart sides and a base wall extending between the sides;

a plurality of rollers movably mounted in each one of the channels, a portion of each roller extending above the respective channel at a first height; and a reverse flow stop pivotally mounted within each one of the channels for movement between a stop position and a flow position, each stop having a first end including a stop arm, the stop having a second end including a weighted portion responsive to gravitational force urging the stop towards the stop position, whereby the stop arm extends above the respective channel at a second height, which is greater than the first height.

11. The flow rack assembly of claim 10 wherein the flow rack assembly has a front end and a back end, at least a portion of each stop being mounted in the respective channel adjacent to the back end of the assembly.

12. The flow rack assembly of claim 10 wherein the stop arm and the weighted portion of each stop are integrally formed.

13. The flow rack assembly of claim 10 wherein each stop includes two opposing pins pivotally attached to the respective channel.

14. The flow rack assembly of claim 13 wherein each channel includes a plurality of opposed saddles, the pins of each stop being mounted in opposed saddles of the respective channel.

15. The flow rack assembly of claim 13 wherein the weighted portion of a respective stop is positioned between the respective stop arm and the base wall of the respective channel when the respective stop is in the stop position.

16. The flow rack assembly of claim 15 further comprising a rotation limiter attached to each stop.

17. The flow rack assembly of claim 16 wherein the rotation limiter, the stop arm and the weighted portion of each stop are integrally formed.

18. The flow rack assembly of claim 16 wherein each rotation limiter is rotatable toward the base wall in response to the stop being rotated to the flow position.

19. The flow rack assembly of claim 10 wherein the stop arm of each one of the stops extends above the respective channel at a height approximately the same as the first height when the respective stop is in the flow position.

20. A method of limiting flow on a flow rail assembly in a reverse direction, comprising the steps of:

movably mounting a plurality of rollers in an elongated channel with a portion of each roller extending above the channel at a first height;

pivotally mounting a reverse flow stop having a first end including a stop arm in the channel such that the stop is movable between a stop position and a flow position; and attaching a weighted portion to a second end of the stop, the weighted portion being responsive to gravitational force urging the stop towards the stop position whereby the stop arm extends above the channel at a second height, which is greater than the first height.

21. The method as defined in claim 20 wherein the step of movably mounting rollers includes the step of providing opposed first saddles in the channel for receiving the rollers.

22. The method as defined in claim 21 wherein the step of pivotally mounting the stop includes the step of providing opposed second saddles in the channel for receiving the stop.

* * * * *

UNITED STATES PATENT AND TRADEMARK OFFICE
CERTIFICATE OF CORRECTION

PATENT NO. : 6,230,908 B1 Page 1 of 1
DATED : May 15, 2001
INVENTOR(S) : Robert C. Sloan et al.

It is certified that error appears in the above-identified patent and that said Letters Patent is hereby corrected as shown below:

Column 2,
Line 25, before "the", delete "against"

Column 4,
Line 9, after "position F", insert -- Fig. 2. --

Signed and Sealed this

Ninth Day of April, 2002

Attest:

JAMES E. ROGAN
Attesting Officer   Director of the United States Patent and Trademark Office